H. W. RAVENSHAW.
MAGNETIC CLUTCH.
APPLICATION FILED AUG. 26, 1909.
947,687. Patented Jan. 25, 1910.
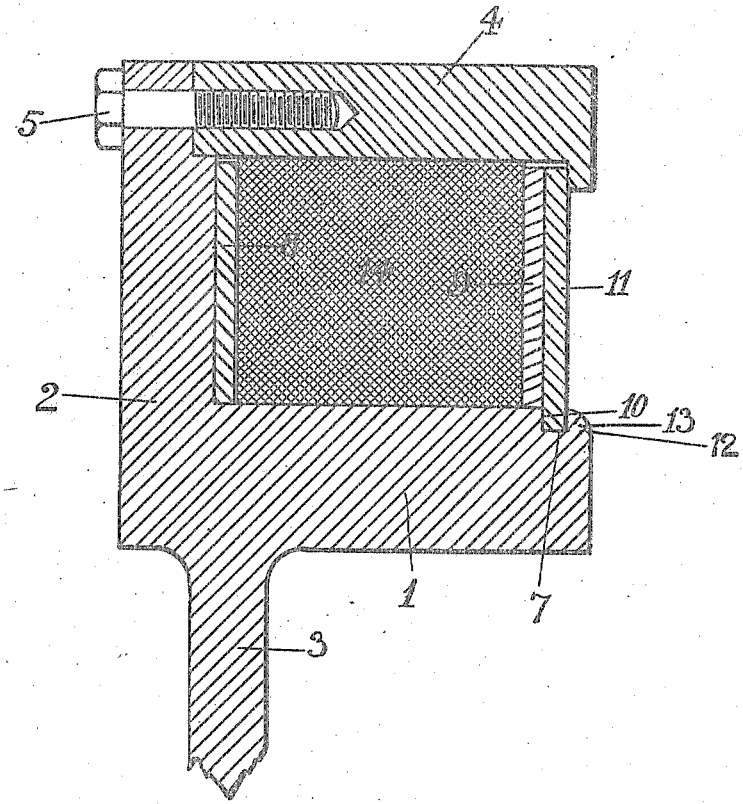
Witnesses
Inventor
Henry Wilfock Ravenshaw
By
Attorneys

UNITED STATES PATENT OFFICE.

HENRY WILLOCK RAVENSHAW, OF HANWELL, ENGLAND.

MAGNETIC CLUTCH.

947,687. Specification of Letters Patent. Patented Jan. 25, 1910.

Application filed August 26, 1909. Serial No. 514,789.

*To all whom it may concern:*

Be it known that I, HENRY WILLOCK RAVENSHAW, of Rutland House, Hanwell, in the county of Middlesex, England, have invented new and useful Improvements in or Connected with Magnetic Clutches, of which the following is a specification.

This invention relates to improvements in or connected with magnetic clutches and is particularly applicable in the case of clutches of that type in which the electromagnetic element consists of a single annular trough mounted upon a spider or the like, the said trough holding an annular energizing coil. In clutches of this type it is usual to wind the energizing coil upon an insulating casing or bobbin. The employment of such a casing or bobbin however has the disadvantage in practice that if it be made of such a size as to fit tightly on to the ring forming the inner limb of the U-shaped trough, as it should be, it is a very difficult matter to get it slipped on to the said ring. This is especially so in the case of clutches of large diameter.

The object of the present invention is to obviate this drawback and I shall now proceed to describe my invention with reference to the accompanying drawing, in which the figure is a cross section of the annular U-shaped trough of a clutch of the type indicated above.

The clutch body is composed of a spider 3 or the like, a flat, annular base 2, an inner annular flange 1 and an outer removable annular flange 4 held against the flat annular base 2 by a screw 5 or the like. The annular flange 1 is turned down to form an annular shoulder 7.

Now in order to place the winding in the trough I proceed as follows. The outer flange 4 being removed, I first place on the inner base 2, a flat ring 8 of insulating material and push this up against the bottom of the trough as shown, and I then place a second flat ring 9, also of insulating material, on the flange 1 so that its outer face is flush with the shoulder 10. I now place over the turned down end of the flange 1 a flat brass retaining ring 11, the opening in which is of such diameter as to just fit on to the turned down part, and then upset the metal from the corner 12 so as to form a ridge 13, which ridge holds the brass retaining ring 11 in position. The insulated wire for the energizing coil is now wound on in the space 14 and the flange 4 is subsequently placed in position and secured by screws or the like, 5.

If desired a ring of insulating material may be placed on the limb 1.

The flange 4 may be provided with an inwardly projecting edge 15 which overhangs the outside edge of the brass retaining ring 11, so that should the ring 11 have been pressed outward at all by the winding it will be forced back into its proper place when the flange 4 is placed in position and the screws 5 are tightened up.

I claim:

An annular trough-shaped magnetic clutch, comprising the combination of the spider 3, the flat annular base 2 connected thereto, an outer cylindrical flange, removably mounted on and secured to the flat base, and having an inwardly projecting edge thereon; an inner cylindrical flange; a retaining-ring rigidly and permanently attached thereto and held in place by the inwardly projecting edge of the outer flange, and an electromagnetic winding in the trough, confined by the removable flange and the retaining ring, substantially as described.

In witness whereof I have signed my name to this specification in the presence of two subscribing witnesses.

HENRY WILLOCK RAVENSHAW.

Witnesses:
R. WELLAMS,
H. D. JAMESON.